United States Patent [19]

Gaffney et al.

[11] Patent Number: 5,258,060
[45] Date of Patent: Nov. 2, 1993

[54] ADSORPTIVE SEPARATION USING DILUTED ADSORPTIVE PHASE

[75] Inventors: Thomas R. Gaffney, Allentown; John F. Kirner, Orefield; Ravi Kumar, Allentown; Robin J. Maliszewskyj, Hatfield, all of Pa.

[73] Assignee: Air Products and Chemicals, Inc., Allentown, Pa.

[21] Appl. No.: 950,120

[22] Filed: Sep. 23, 1992

[51] Int. Cl.$^5$ ............................................. B01D 53/04
[52] U.S. Cl. ........................................ 95/101; 95/130; 95/902
[58] Field of Search ................ 55/25, 26, 28, 58, 62, 55/68, 74, 75, 161–163, 179, 389

[56] References Cited

U.S. PATENT DOCUMENTS

| | | | |
|---|---|---|---|
| 3,140,931 | 7/1964 | McRobbie | 55/25 |
| 3,140,932 | 7/1964 | McKee | 55/68 |
| 3,140,933 | 7/1964 | McKee | 55/68 |
| 3,181,231 | 5/1965 | Breck | 29/182.5 |
| 3,237,377 | 3/1966 | Skarstrom | 55/25 |
| 3,313,091 | 4/1967 | Berlis | 55/58 |
| 3,356,450 | 12/1967 | Heinze | 23/112 |
| 4,026,680 | 5/1977 | Collins | 55/389 X |
| 4,481,018 | 11/1984 | Coe et al. | 55/68 |
| 4,499,208 | 2/1985 | Fuderer | 502/415 |
| 4,544,378 | 10/1985 | Coe et al. | 55/68 |
| 4,557,736 | 12/1985 | Sircar et al. | 55/389 X |
| 4,603,040 | 7/1986 | Kuznicki et al. | 423/328 |
| 4,762,537 | 8/1988 | Fleming et al. | 55/389 X |
| 4,818,508 | 4/1989 | Flank et al. | 423/328 |
| 4,859,217 | 8/1989 | Chao | 55/68 |
| 4,925,460 | 5/1990 | Coe et al. | 55/25 |
| 4,950,312 | 8/1990 | Puppe et al. | 55/68 |
| 4,971,605 | 11/1990 | Tarman | 55/25 |
| 5,152,813 | 10/1992 | Coe et al. | 55/75 X |
| 5,174,979 | 12/1992 | Chao et al. | 55/68 X |

FOREIGN PATENT DOCUMENTS

| | | |
|---|---|---|
| 2-153818 | 6/1990 | Japan . |
| 7802803 | 9/1979 | Netherlands ............. 55/26 |
| 1567856 | 5/1980 | United Kingdom . |

OTHER PUBLICATIONS

Breck, D. W.; "Zeolite Molecular Sieves"; 1974; p. 737.
Baksh, et al.; "Lithium Type X-Zeolite as a Superior Sorbest for Air Separation" Sep. Sci & Tech., 27(3), 277–294, 1992.
Coe, et al.; "Molecularly Engineered, High-Perf. Adsorbent Self-Bound Low-Silica X Zeolite" American Chemical Society, 1988, pp. 478–491.
Yang and Cen; "Improved Pressure Swing Adsorption Process for Gas Separation: . . . "; Ind. Eng. Chem Process Des. Dev.; 1986; pp. 54–59; vol. 25.

Primary Examiner—Robert Spitzer
Attorney, Agent, or Firm—Geoffrey L. Chase; James C. Simmons; William F. Marsh

[57] ABSTRACT

The present invention is directed to adsorptive separation of nitrogen with active adsorbent phases with high $N_2$ capacity and high heats of adsorption when diluted with inert material at levels ranging from 5% to 80%. The presence of diluent reduces the temperature swings in the adsorbent bed, which increases the utilizable effective $N_2$ working capacity and decreases the relative amount of $O_2$ left unrecovered on the active adsorbent phase. The net result is equal or better process performance allowing utilization of a lower amount of active adsorbent phase. Use of a diluent having a higher heat capacity than that of the active adsorbent phase increases these benefits, but dilution effects are beneficial even for diluents with heat capacities equal to or lower than that of the active adsorbent phase.

29 Claims, 3 Drawing Sheets

ADSORPTIVE SEPARATION USING DILUTED ADSORPTIVE PHASE

FIELD OF THE INVENTION

The present invention is directed to the separation of nitrogen from gas streams, such as air. More specifically, the present invention includes an improved adsorbent zone for effecting this separation using pressure swing adsorption (PSA) processes. More specifically, the present invention enhances the operating performance of zeolitic adsorbents used in PSA processes for the separation of nitrogen by diluting the zeolitic phase. The present invention reduces the temperature fluctuations of these materials when employed in PSA processes for the separation of nitrogen.

BACKGROUND OF THE PRIOR ART

Separations of gas mixtures containing nitrogen are important industrial processes. The recovery of oxygen and/or nitrogen from air is practiced on a large scale. In the past, the primary method used for this separation was cryogenic distillation. More recently, pressure swing adsorption (PSA) processes are being used in applications which have smaller gas requirements. In PSA processes, compressed gas is fed through a bed containing an adsorbent material with a preference for one of the components of the gas to produce an exit stream enriched in the other components. A stream enriched in the adsorbed component can be obtained by desorption.

The use of crystalline zeolitic molecular sieves in PSA processes for air separation is well known. McRobbie in U.S. Pat. No. 3,140,931 claims the use of crystalline zeolitic molecular sieve material having apparent pore sizes of at least 4.6 Angstroms for separating oxygen-nitrogen mixtures at subambient temperatures. McKee in U.S. Pat. No. 3,140,932 specifically claims the Sr, Ba, or Ni ion exchanged forms of X-zeolite. McKee in U.S. Pat. No. 3,140,933 claimed the use of LiX-zeolite to separate oxygen-nitrogen mixtures at feed pressures between 0.5 and 5 atm and at a temperature between about 30° C. and −150° C. Berlin, in U.S. Pat. No. 3,313,091 claims the use of SrX-zeolite at adsorption temperatures near atmospheric, and subatmospheric desorption pressures.

Formed adsorbent particles containing zeolites used for equilibrium air separation also typically contain about 20 wt % inert inorganic material. The purpose of this material is to bind the zeolite crystallites into an agglomerate having high physical strength and attrition resistance in order that the zeolite crystallites can be used in adsorption processing.

Several patents claiming zeolitic adsorbents for air separation have acknowledged the presence of this inert material. For example, Coe et al. in U.S. Pat. Nos. 4,481,018 and 4,544,378 demonstrated the improved performance of faujasite compositions containing divalent cations provided they were activated in such a way that a preponderance of the polyvalent cations were in the dehydrated/dehydroxylated state. They claim compositions containing at least 50 wt % faujasite, preferably 75 wt % faujasite, wherein the balance is selected from the group consisting of an A-type zeolite, an inert clay binder, other inert solid materials and mixtures thereof. However, there is no indication that there is any benefit in adsorptive performance to be gained by the use of binder.

Various other processes have been reported in the patent literature for achieving a zeolite in a final product contained in a matrix, where, in general, the zeolite component is present to the extent of only 10 to 20 wt %. However, these products are largely directed toward use in cracking catalysts. (D. W. Breck, Zeolite Molecular Sieves, 1974, p. 737).

Breck in U.S. Pat. No. 3,181,231 claims an agglomerate material comprised of zeolite molecular sieve particles and larger metal bodies, present in levels of 5 to 30% by weight, sintered to the outer surface of the zeolite crystals. The objective of his invention is to produce a zeolitic material having superior crush strength. He indicates that greater than 30 wt % metal bodies is not necessary, and, in fact, is undesirable. He states that it is preferred to use as little binder as possible to achieve the desired hardness, since excess binder reduces the adsorptive capacity. Breck makes no mention of a possible process performance advantage to be gained by the presence of such a high-heat-capacity binding material within the formed agglomerate.

Japanese Kokai 62 297,211-A2 discloses a porous body, presumably a monolith, containing 40-5 weight percent inorganic binder and 60-95 weight percent zeolite powder in general. It teaches that these bodies gave good results in $O_2$ PSA.

M. S. A. Baksh, et.al. in "Lithium Type X-Zeolite as a Superior Sorbent for Air Separation" discloses the preparation of LiX-zeolite by ion exchange with commercial NaX-zeolite 8×12 mesh beads. The lithium exchange level is not set forth.

Japanese Kokai 2,153,818 discloses a zeolitic material for air separation having an A-zeolite structure comprising 40-85% and a kaolin content of 60-15%.

Those skilled in the art have generally believed that the addition of binder reduces the adsorptive properties of zeolitic containing materials. In the past, the trend has been to try to reduce the levels of binder from the typical 20% to as low as possible, often as low as 5%., while at the same time maintaining adequate crush strength. For example, Heinze in U.S. Pat. No. 3,356,450 states that it is advantageous to obtain hard formed zeolite particles with the lowest possible binder content to maintain high adsorption capacity. He discloses the use of a process which starts with molecular sieve granules bound with silicic acid, which are then treated with aqueous solutions containing alumina and alkali metal hydroxide, whereby the binder is converted to molecular sieve particles. The result is a practically binder-free shaped material with good abrasion resistance.

At the extreme of this trend toward reduced binder contents is the development of processes for preparing binderless bodies. Flank et al. (U.S. Pat. No. 4,818,508) teach the preparation of zeolites, particularly X, Y, and A, in massive bodies from calcined preforms made of controlled-particle-size kaolin-type clay. Kuznicki et al. (U.S. Pat. No. 4,603,040) teach the preparation of low silica X-zeolite (LSX) in the form of essentially binderless aggregates by reaction of calcined kaolin preforms in an aqueous solution of NAOH and KOH. GB 1,567,856 teaches a process for converting an extruded mixture of metakaolin and sodium hydroxide to A-zeolite. The advantage stated is that the method does not require the use of a binder such as clay, which usually reduces the activity of the molecular sieve by 15-20%.

Adsorbents produced from these binderless bodies are stated to have superior adsorptive properties when used for air separation. One such adsorbent is Ca low silica X-zeolite (CaLSX), prepared by Coe et al., (Coe, et al., "Molecularly Engineered, High-Performance Adsorbent: Self-Bound Low-Silica X Zeolite" in Perspectives in Molecular Sieve Science; Flank, W. H.; Whyte, Jr., T. E., Eds.; ACS Symposium Series 368; American Chemical Society: Washington, D.C., 1988; pp 478-491). "The self-bound LSX adsorbents do not have any binder to 'dilute' the active component and lower the gas capacity." In addition, Coe et al. in U.S. Pat. No. 4,925,460 prepared chabazite from zeolite Y extrudate. They state, "This method produces a superior adsorbent, since adsorptive capacity decreases as binder content increases." These materials were converted to the Li form and used for separation of air, among other processes. Thirdly, Chao in U.S. Pat. No. 4,859,217 claims a process for selectively adsorbing $N_2$ using X-zeolite having a framework Si/Al molar ratio not greater than 1.5 and having at least 88% of its $AlO_2$ tetrahedral units associated with Li cations. He converted the bulk of the 20% binder in a zeolite "preform" agglomerate to X-zeolite crystals, obtaining essentially a binderless zeolite prior to ion exchanging into the Li form.

PSA processes for selectively adsorbing nitrogen from gas mixtures, such as air, comprise contacting the gas mixture with a zone containing an adsorbent such as one of those described above which is selective for the adsorption of nitrogen. Typically the zone is operated through a series of steps comprising: adsorption, during which the gas mixture contacts the adsorbent, nitrogen is selectively adsorbed and oxygen passes through the zone and can be recovered as product; depressurization during which the gas mixture contact is discontinued and the zone is reduced in pressure to desorb the nitrogen which can be recovered as product; and repressurization with air or oxygen product to the adsorption pressure.

The heat effects that occur during the adsorption and desorption steps can be of significance in the overall performance of PSA processes. Since the processes are essentially adiabatic, release of heat from the heat of adsorption increases the bed temperature during the adsorption step. Because of the higher temperature, adsorbate loading at the end of adsorption is lower than would be the case if the temperature did not increase. Likewise, during the desorption and optional purge steps, heat is required to desorb the adsorbate, decreasing the bed temperature. Because of the lower temperature, adsorbate loading at the end of desorption is higher than would be the case if the temperature did not decrease. These fluctuations in temperature reduce the working capacity of the adsorbent bed compared to the isothermal case.

The prior art has recognized that reduction of these temperature fluctuations can be beneficial when the adsorbate is strongly adsorbed with a high heat of adsorption. For example, Fuderer in U.S. Pat. No. 4,499,208 teaches the benefits to be obtained in using activated carbon doped with an inert inorganic material with a higher volumetric heat capacity than the carbon for strongly sorbed adsorbates at high partial pressures. He specifically claims the use of dense alumina with activated carbon. Fuderer mentions that molecular sieves having such inert materials could also be advantageous in various PSA separations for which such molecular sieves are well suited. However, he notes that the doped adsorbents of his invention are not applicable for advantageous use in all PSA separations. The preferred adsorbates are $CO_2$ and more strongly sorbed adsorbates. There is no indication that doping would enhance the performance of air separation adsorbents, which adsorb $N_2$ much more weakly than $CO_2$. There is no suggestion that comparable or lower heat capacity diluents would be useful for PSA adsorbents.

Yang and Cen (R. T. Yang and P. L. Cen, Ind. Eng. Chem. Process Des. Dev., 1986, 25, 54-59) also demonstrated that high heat capacity inert additives resulted in substantial improvements in product purities and recoveries for bulk PSA separations of $H_2/CH_4$ and $H_2/CO$ mixtures using activated carbon adsorbents. Although the heats of adsorption of $CH_4$ and $CO$ on activated carbon are similar to the heat of adsorption of $N_2$ on zeolites, the high pressures used in these separations (feed pressure of 21.4 atm) resulted in substantially larger temperature excursions in the bed than are observed for air separation. As in the reference of Fuderer, there is no indication that inert additives would enhance the performance of air separation adsorbents.

It is also notable that in both the case of Fuderer and that of Yang and Cen, the dopants or inert additives had higher heat capacities than the active adsorbent phase. There is no indication in the prior art that diluting a zeolitic adsorbent with a material that has heat capacity equal to or lower than the zeolite would result in a performance improvement.

In summary, there is no indication in the prior art that dilution of the zeolitic phase is beneficial for low heat processes, such as air separation. There is no indication that any temperature effect for air separation would be of sufficient magnitude that performance benefits resulting from dilution would overcome the detrimental effects of decreasing the specific isothermal adsorptive capacity (mmol/g) of the adsorbent zone. There is no indication that dilution of the zeolitic phase with a diluent with a lower heat capacity than the zeolitic phase will have a beneficial effect on air separation.

BRIEF SUMMARY OF THE INVENTION

The present invention is a process of selectively adsorbing nitrogen from a gas mixture containing nitrogen and at least one less strongly adsorbed other gas component, comprising; contacting the gas mixture in an adsorption zone with an adsorbent selective for nitrogen, selectively adsorbing nitrogen on the adsorbent and passing the gas mixture less the adsorbed nitrogen out of the zone, wherein the adsorbent zone comprises an active adsorbent phase with an isothermal nitrogen working capacity of at least about 0.6 mmol/g and at least about 5 weight percent of an inert diluent.

Preferably, the diluent is substantially integral with the active adsorbent phase.

Alternatively, the diluent is substantially discrete from the active adsorbent phase.

Preferably, the isothemal nitrogen working capacity of the active adsorbent phase is determined at about 23° C. and over a pressure change of about 0.2 to 1.2 atmospheres.

Preferably, the heat capacity of the diluent is no greater than the heat capacity of the active adsorbent phase.

Alternatively, the heat capacity of the diluent is greater than the heat capacity of the active adsorbent phase.

Preferably, the diluent is at least about 25 weight percent of the adsorbent zone.

Alternatively, the diluent is in the range of about 25 to 95 weight percent of the adsorbent zone.

Alternatively, the diluent is in the range of 25 to 80 weight percent of the adsorbent zone.

Alternatively, the diluent is in the range of 60 to 80 weight percent of the adsorbent zone.

Preferably, the isothermal nitrogen working capacity of the active adsorbent phase and the amount of diluent are such as to provide an isothermal nitrogen working capacity of said adsorbent zone of about 0.4 to 0.6 mmol/g.

Preferably, the active adsorbent phase is selected from the group consisting of zeolite, titanium silicates, phosphates and mixtures thereof.

More preferably, the active adsorbent phase is a zeolite selected from the group consisting of A-zeolite, X-zeolite, Y-zeolite, chabazite and mixtures thereof.

Preferably, the zeolite has a zeolitic silicon to aluminum ratio less than or equal to 1.5.

Preferably, the zeolite is ion exchanged with lithium to at least approximately 50%.

More preferably, the zeolite is ion exchanged with a second ion to approximately 5% to 50%.

More preferably, the zeolite is ion exchanged with approximately 15% of the second ion and 85% lithium.

More preferably, the second ion is selected from the group consisting of calcium, strontium and mixtures thereof.

Optimally, the zeolite is ion exchanged with approximately 15% calcium and 85% lithium.

Preferably, the gas mixture contains nitrogen and oxygen.

More preferably, the gas mixture is air.

More preferably, an oxygen and nitrogen containing gas mixture contacts an adsorbent zone, the nitrogen is selectively adsorbed and the oxygen passes through the zone and is recovered as an oxygen enriched product.

Preferably, the oxygen product has a purity of at least approximately 90% oxygen.

More preferably, the zone is operated through a series of steps comprising: adsorption during which the gas mixture contacts the active adsorbent phase, nitrogen is selectively adsorbed and oxygen passes through the zone and is removed; depressurization during which the gas mixture contact is discontinued and the zone is reduced in pressure to desorb the nitrogen; and repressurization with oxygen to the adsorption pressure.

Most preferably, the zone is operated through a series of steps comprising: adsorption during which the gas mixture contacts the active adsorbent phase, nitrogen is selectively adsorbed and oxygen passes through the zone and is removed; depressurization during which the gas mixture contact is discontinued and the zone is reduced in pressure to desorb the nitrogen; evacuation to further desorb the nitrogen to below ambient pressure; and repressurization with oxygen product to the adsorption pressure.

Alternatively, the active adsorbent phase is a crystalline X-zeolite adsorbent having a framework $SiO_2/Al_2O_3$ molar ratio of not greater than 3.0 and having at least 88 percent of its $AlO_2$ tetrahedral units associated with lithium cations.

Alternatively, the active adsorbent phase comprises a crystalline X-zeolite having a zeolitic Si/Al ratio , 1.5 and an at least binary ion exchange of the exchangeable ion content with between 5% and 950% lithium and with between 5% and 95% of a second ion selected from the group consisting of calcium, strontium and mixtures thereof, wherein the sum of the lithium and second ion ion exchange is at least 60% of the exchangeable ion content.

Alternatively, the active adsorbent phase is lithium exchanged chabazite having a Si/Al ratio from about 2.1 to 2.8 wherein at least 65% of the exchangeable ion capacity is in the lithium form.

DETAILED DESCRIPTION OF THE INVENTION

Figure 1:
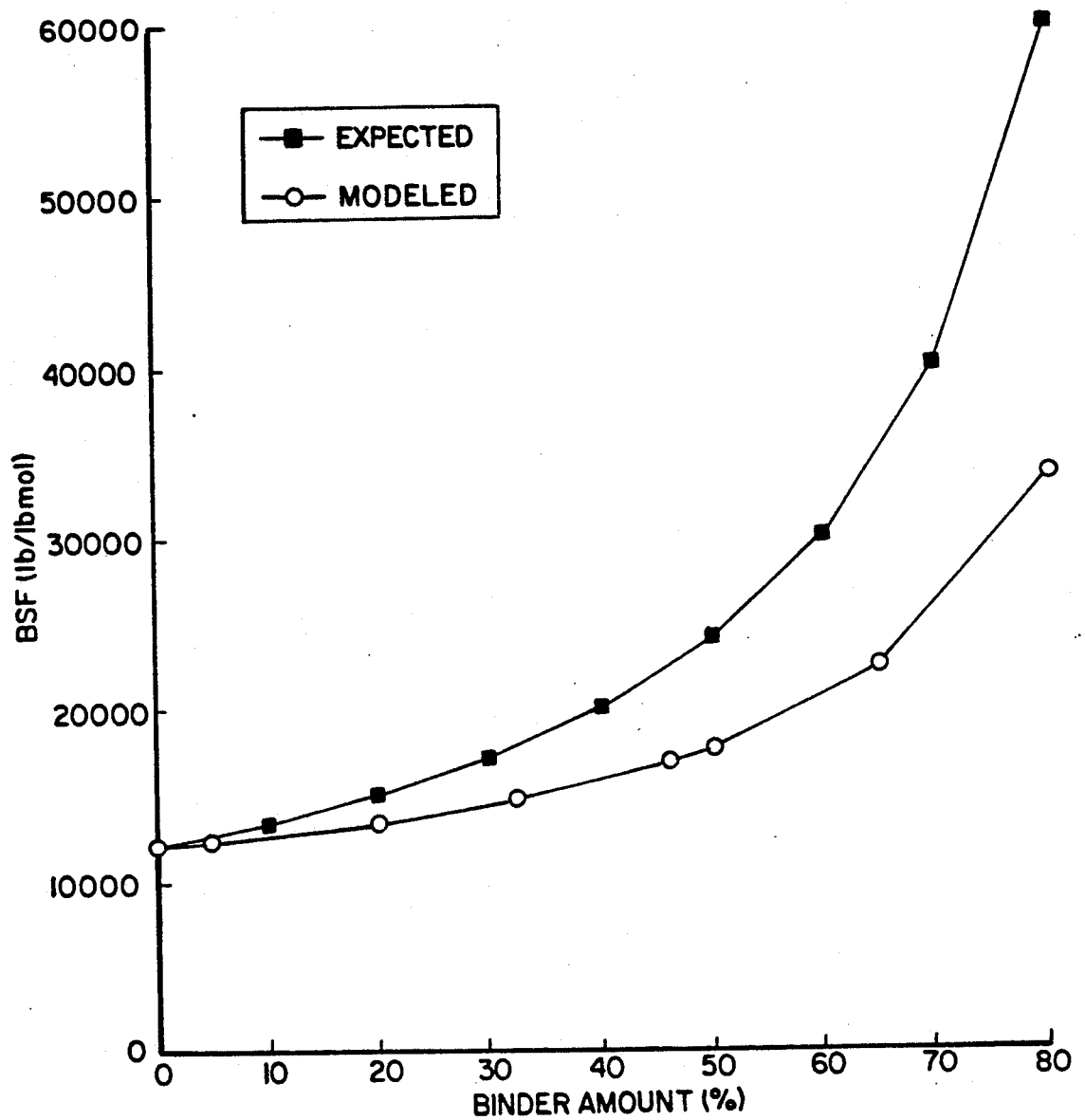
FIG. 1 is a graph of the expected and actual modeled results of bed size factor (BSF) versus the percent of diluent added to an adsorbent of 85%/10%/5% LiCaNa LSX-zeolite.

The present invention is directed to the use of binder or diluent with active adsorbent phases with high capacity for nitrogen adsorption from mixtures of gases containing nitrogen, such as air, wherein the diluent decreases the specific nitrogen capacity (mmol/g) of an adsorption zone and thus reduces the detrimental effects of the heat of adsorption. An active adsorbent phase is that adsorbent material in the adsorbent zone, such as zeolite, which actually participates or contributes to the adsorption of the desired adsorbate and has a high $N_2$ isothermal working capacity, preferably of at least 0.6 mmol/g. Unexpectedly it has been found that the reduction in capacity by the presence of an inert diluent is offset by the reduction in exotherm associated with adsorption with the result that recovery and/or productivity are increased and the amount of evacuation gas is reduced, even when the heat capacity of the diluent is equal to or lower than that of the adsorbent. The term inert as used here means a material having substantially no nitrogen capacity at standard temperature and pressure. The isothermal nitrogen working capacity is defined as the difference in the capacity at a chosen maximum pressure of the process and a chosen minimum pressure of the process at any given process temperature. More specifically, the preferred isothermal nitrogen working capacity for identifying active adsorbent phases whose performance will benefit by dilution is the difference in the capacity at a maximum pressure of about 1.2 atm. of the process and a minimum pressure of about 0.2 atm. at about 23° C.

Preferably, the amount of diluent is that required to provide a nitrogen isothermal working capacity of the adsorbent zone of about 0.4 to 0.6 mmol/g. As will become evident from the examples below, a significant process performance gain can be made by the use of such a diluted adsorbent beyond the performance achievable with the adsorbent alone. Since the adsorbent is expensive relative to the diluent (binder), increasing the relative amount of diluent in the adsorbent zone while maintaining productivity, as well as other performance factors, lowers the cost of the PSA process.

The preferred active adsorbent phase is a zeolite. Any zeolite can be thus improved by dilution and can be any of a number of active phases, such as zeolites A, X, Y, or chabazite or mixtures thereof, provided that the material has a high $N_2$ isothermal working capacity ($\geq 0.6$ mmol/g). Lower Si/Al ratios are preferred because they have more cations. In addition, the ion exchange form is not critical, although very-high-capacity materials often contain $Li^{30}$ or alkaline earth cations, such as $Ca^{2+}$ or $Sr^{2+}$. These materials will receive the most process performance gains from dilution. Specific adsorbents that have shown process performance gains include: LiX-Zeolite, LiLSX-Zeolite, (Li,Ca)LSX-Zeolite, (Li,Ca,Na)LSX-Zeolite, CaLSX-Zeolite, (Li,Na)LSX-Zeolite, or LiChabazite. Preferably, a crystalline X-zeolite is used having a zeolitic framework $SiO_2/Al_2O_3$ molar ratio of not greater than 3.0 and having at least 88% of its $AlO_2$ tetrahedral units associated with lithium cations. An alternative preferred zeolite is a crystalline X-zeolite having a zeolitic Si/Al ratio less than or equal to 1.5 and an at least binary ion exchange of the exchangeable ion content with between 5% and 95% lithium and with between 5% and 95% of a second ion selected from the group consisting of calcium, strontium and mixtures thereof wherein the sum of the lithium and second ion ion exchange is at least 60% of the exchangeable ion content. A further alternative preferred zeolitic adsorbent is lithium exchanged chabazite having a Si/Al ratio from about 2.1 to 2.8 wherein at least 65% of the exchangeable ion capacity is in the lithium form. Adsorbents with higher heats of adsorption for nitrogen experience a greater benefit by the dilution of this invention than adsorbents with the same capacity, but lower heats of adsorption.

The above-mentioned inert diluent should be a material that has no significant adsorptive capacity for nitrogen or other process gases, as well as no reactivity with the adsorbent or zeolite material or the process gases. Such a material could be, but is not limited to, binders traditionally used to form zeolite pellets, tablets, or beads for PSA processing. Examples of such diluents include silica, alumina, aluminosilicates, bentonite, kaolin, and attapulgite. In one embodiment of the present invention, the diluent would be substantially integral with the adsorbent in the form of pellets, beads, or similar particles prepared by methods described in the prior art, such as the use of molding machines, pelletizers, granulators, and extruders. The benefits of the invention have been demonstrated in cases where the heat capacity of said diluent is equal to or somewhat less than that of the adsorbent or zeolite. As is well known in the prior art, the water must be removed from zeolitic adsorbents by appropriate thermal treatment for them to be used for air separation. In addition, it is known that some materials are more sensitive to degradation of their adsorptive properties during thermal activation, and thus require more careful treatment such as that of Coe et al. in U.S. Pat. Nos. 4,481,018 and 4,544,378 in order to realize their full adsorptive potential.

In another embodiment of the invention, said diluent would be substantially discrete from the adsorbent. It is postulated that such methods as dispersing separate particles throughout the bed, or adding a separate structure within the vessel, could effectively reduce the cyclic temperature swings and achieve a performance benefit. This option would provide much more freedom in the choice of material such that a very high volumetric-heat-capacity substance (e.g., metals or low-porosity metal oxides) could be utilized to further reduce temperature swings. In order to obtain the benefit of this configuration, there must be good heat transfer from the adsorbent-containing particles to the diluent particles or structure. Additionally, use of a more dense formed material would have the added benefit of reducing the micropore (or meso- or macropore) void fraction. The diluent particles should not have a significant dispersive effect on the mass transfer zone.

This invention would preferably be utilized in the separation of nitrogen from oxygen in air using a pressure swing adsorption (PSA) or vacuum swing adsorption (VSA) process. In such a process, an adsorbent zone or bed comprising the active adsorbent phase and a diluent, in one of the forms described above, is initially pressurized with oxygen or air to a pressure between 0.5 atmospheres and 3 atmospheres. A gas stream comprising nitrogen and oxygen, such as air, at a temperature between 0° C. and 50° C. and a pressure between 0.5 atmospheres and 5 atmospheres, is passed over the adsorbent bed. A portion of the nitrogen in the gas stream is adsorbed by said adsorbent, thereby producing an oxygen-enriched product stream. The nitrogen-containing adsorbent bed is subsequently depressurized with the option of being purged with oxygen-enriched gas to produce a nitrogen-enriched stream. Said depressurization is preferably performed at vacuum levels to gain the greatest advantage of dilution. The bed is then repressurized with product oxygen or air and adsorption can be reinitiated.

The zeolitic adsorbents used in demonstrating the effect of dilution were prepared in the following ways. NaX-zeolite powder with a Si/Al ratio of 1.23 was obtained from Linde. (Na,K)LSX-zeolite powder was prepared by the method of Kuhl and Sherry in UK 1580928. (See also Kuhl, G. H. *Zeolites* 1987, 7, 451).

LiLSX-zeolite was prepared by ion exchange of (Na,K)LSX-zeolite powder using five static exchanges at 100° C. with a 6.3-fold equivalent excess of 2.2 M LiCl. Various samples of (Ca,Li)LSX-zeolite were prepared by adding LiLSX-zeolite powder to appropriate amounts of 0.05 M $CaCl_2$ and stirring at room temperature for about 4 h. The samples were filtered but not washed to prevent hydrolysis of the Li cations. The use of dilute solution made the error in cation levels introduced by the solution retained on the filter cake insignificant. Various samples of (Li,Na)LSX-zeolite were prepared similarly by adding LiLSX-zeolite powder to appropriate amounts of 0.1 M NaCl. Various samples of (Li,Ca,Na)LSX-zeolite were prepared similarly by adding LiLSX-zeolite powder to appropriate amounts of 0.1 N solution containing stoichiometric amounts of $CaCl_2$ and NaCl. The samples were filtered but not washed.

NaLSX-zeolite was prepared by ion exchange of (Na,K)LSX-zeolite using three static exchanges at 100° C. with a 4.2-fold equivalent excess of 1.1 M NaCl. CaLSX-zeolite was prepared by ion exchange of (Na,K)LSX-zeolite using three static exchanges at 100° C. with a 3.8-fold equivalent excess of 1.0 M $CaCl_2$. LiX-zeolite was prepared from Linde 13X (NaX-zeolite) using five static exchanges at 100° C. with a 5.6-fold equivalent excess of 1.1 M LiCl.

The siliceous synthetic chabazite for these studies was prepared according to the method of Bourgogne (U.S. Pat. No. 4,503,024). Zeolite Y, silica sol, and KOH were converted to pure chabazite by heating at 100° C.

for 3 days. The chabazite product was converted into the lithium form using a batch ion exchange procedure. The chabazite was first exchanged four times with 2 M NaCl at 100° C. and then the resulting sodium chabazite exchanged four times with LiCl at 100° C. This produced a chabazite having 91% of its exchangeable cations in the lithium form.

Adsorption measurements were made at high pressure using an automated volumetric adsorption unit. Approximately 2-2.5 g of sample was loaded into a stainless steel sample cylinder protected with a 20-micron filter to prevent loss of sample. The samples were heated under vacuum at 1° C./min or less to 400° C. and held at 400° C. until the pressure dropped below $1 \times 10^{-5}$ torr. After activation, $N_2$ and $O_2$ isotherms were obtained to 12000 torr at 23° and 45° C.

Oxygen vacuum swing adsorption air separation, where oxygen is unadsorbed and nitrogen is adsorbed ($O_2$ VSA), process performance was simulated using a global energy and mass balance model (GEM) similar to one described by Smith, O. J. and Westerberg, A. W., "The Optimal Design of Pressure Swing Adsorption Systems", Chemical Eng. Sci. 46 (12), 2967-2976, 1991, which is routinely used as an indicator of relative performance in adsorbent screening. This model is similar to "Flash" calculations in distillation (e.g., W. L. McCabe, and J. C. Smith, "Unit Operations in Chemical Engineering", 3rd edition, McGraw Hill, New York (1976), p. 534).

The GEM computer process model was used to simulate a standard $O_2$ VSA process cycle that included adsorption, purge, and desorption at chosen pressures and end-of-feed temperature. The model is equilibrium based; i.e., it assumes no spatial concentration gradients and complete bed utilization. Temperature changes within the bed during the cycle are included, but the model does not account for temperature gradients (i.e., the bed temperature is uniform at any given time). As a first approximation, this is a reasonable assumption in the case of equilibrium-based separation processes. Multicomponent equilibria are estimated by the Ideal Adsorbed Solution Theory (IAST). Inputs for the program include parameters for fits of the isotherms for $N_2$ and $O_2$ at two temperatures, and adsorbent physical properties (bulk density, void volume, and heat capacity).

The three major performance factors considered were Bed Size Factor (BSF), $O_2$ Recovery, and Actual Cubic Feet Evacuated/lbmol Evacuation gas (ACF/Evac). BSF is an indication of the size of the adsorbent beds and the amount of adsorbent, the major impact of which is on capital equipment costs. Recovery is a measure of the $O_2$ in the feed that is obtained as product. Although recovery influences BSF, it also affects operating costs such as utility costs for the feed air blower. ACF/Evac, or actual cubic feet evacuated per lbmole of evacuation gas, influences capital (size of the vacuum train) and utility costs (power for running the vacuum pumps).

By way of placing the model in perspective, its predictions are comparable with data from an actual vacuum swing adsorption pilot unit with main beds 8 feet in length and 4 inches in diameter.

The presence of diluent was accounted for by multiplying the monolayer coverages in the isotherm fits by the weight fraction of zeolite in the zeolite/diluent mixture in the adsorbent zone. The method was validated by comparison of isotherms obtained by derating the monolayer coverages of a zeolite powder with those directly measured on a mixture of 80% zeolite powder and 20% bentonite diluent. Table I shows relatively good agreement between the estimated and actual measured capacities of the zeolite/diluent mixture.

TABLE I

Comparison of Derated Isotherm and Actual Zeolite/Diluent Mixture $N_2$ Capacity 85%/15% (Li,Ca)LSX

| Pressure (atm) | $N_2$ Capacity @ 23° C. (mmol/g) | | | |
|---|---|---|---|---|
| | Powder | Derated Powder Powder × 0.8 | Zeolite/Diluent Mixture | % Difference |
| 0.2 | 0.515 | 0.412 | 0.383 | 6.89 |
| 1.0 | 1.492 | 1.193 | 1.116 | 6.52 |
| 1.5 | 1.806 | 1.445 | 1.355 | 6.20 |

To demonstrate that the derating procedure gives equivalent GEM results to those for an actual diluted adsorbent, the two sets of isotherm parameters obtained for the derated powder and actual zeolite/diluent mixtures shown in Table I were used as inputs to a GEM simulation of a 3-bed $O_2$ VSA process. The process was simulated using an end-of-feed temperature of 75° F., a feed pressure of 1000 torr, and an evacuate on pressure of 300 torr. The results of these simulations are in Section A of Table II. As seen from the results, the differences between the two simulated performances are less than 3%, which is within the usual uncertainty for isotherm capacity measurements. In addition, for confirmation of these results, the simulations were done using a dynamic computer process model (SIMPAC), such as described in the book "Gas Separation by Adsorption Processes", by R. T. Yang, Butterworth Co. (1987), which uses the isotherm fits in the same manner as the GEM model, with the presence of diluent simulated by derating the monolayer coverages. These simulations were performed at the same process pressures as the GEM simulations, but using a feed (as opposed to end-of-feed) temperature of 75° F. which is an effectively higher operating temperature. The SIMPAC results in Table II show the same type of agreement as the GEM results.

TABLE II

Comparison of Derated Isotherm Method and Actual Zeolite/Diluent Mixture $O_2$ VSA Performance 85%/15% (Li,Ca)LSX with 20% Diluent

| Method | Recovery (%) | Diff. (%) | BSF (lb/lbmol) | Diff. (%) | ACF/lbmol Evac | Diff. (%) |
|---|---|---|---|---|---|---|
| Section A: | GEM Modeling: | | | | End-of-Feed Temperature = 75° F. Feed Pressure = 1000 torr Evacuation Pressure = 300 torr | |
| Zeolite/Diluent Mixture | 63.6 | — | 13491 | — | 747 | — |
| Derated Powder | 63.9 | 0.5 | 13156 | 2.5 | 757 | 1.3 |
| Section B: | SIMPAC Modeling: | | | | Feed Temperature = 75° F. Feed Pressure = 1000 torr Evacuation Pressure = 300 torr | |
| Zeolite/Diluent Mixture | 67.0 | — | 12940 | — | 716 | — |
| Derated | 67.2 | 0.3 | 13090 | 1.2 | 715 | 0.1 |

TABLE II-continued

Comparison of Derated Isotherm Method and Actual
Zeolite/Diluent Mixture $O_2$ VSA
Performance 85%/15% (Li,Ca)LSX with 20% Diluent

| Method | Recovery (%) | Diff. (%) | BSF (lb/lbmol) | Diff. (%) | ACF/lbmol Evac | Diff. (%) |
| --- | --- | --- | --- | --- | --- | --- |
| Powder | | | | | | |

EXAMPLE 1

Effect of Diluent on 85%/10%/5% (Li,Ca,Na)LSX

Isotherms for 85%/10%/5% (Li,Ca,Na)LSX-zeolite were obtained by the above-described method, and the $O_2$ VSA performance of the zeolite powder was simulated in the GEM program and optimized for feed pressure, evacuation pressure and temperature.

This simulation/optimization procedure was then repeated for the same zeolite with different diluent amounts ranging from 5% to 80%. Within the GEM program, the presence of inert diluent was simulated by multiplying the monolayer coverages by the zeolite weight fraction, as described above. The heat capacity of the zeolite/diluent mixture was held constant and equal to that for the zeolite powder for all levels of diluent. In the case of the diluent being a traditional binder, this is a fair assumption, as such materials are usually aluminosilicates and have heat capacities similar to those for zeolites.

As the optimum sets of operating conditions were not identical for all diluent amounts, it was necessary to choose a single set of conditions at which to compare the effect of diluent content on adsorbent performance. Therefore, each zeolite/diluent mixture was then simulated at the optimum operating conditions identified for the optimum range of diluent content. The conditions used for 85%/10%/50% (Li,Ca,Na)LSX-zeolite are an end-of-feed temperature of 75° F., a feed pressure of 1000 torr, and an evacuation pressure of 300 torr. The results of this example are in Table III.

Hence, while the overall adsorbent zone or bed requirements are increased, the zeolite requirements are decreased, resulting in a lower cost for the adsorbent zone or bed used in the process. Also unexpected is the slight increase in recovery and the large decrease in ACF/Evac with increasing diluent amounts, the combination of which results in power-savings. Even as little as 5% diluent addition shows notable performance improvements (lower zeolite usage, equal or better recovery, and reduced ACF/Evac). The addition of diluent dramatically reduces the temperature swings in the bed, which is thought to account for the improved performance. The depression in temperature swing with added diluent can be seen in Table III, where the temperature swing is the difference between the temperature of the bed at the end of feed (in this case, 75° F.) and the temperature at the end of evacuation and purge. At some high level of dilution, unique for each material, benefits from additional decreases in temperature swings do not overcome the detrimental effects of dilution (losses of $O_2$ in the voids, increased total extrusion costs for the adsorbent bed or zone due to the larger BSF).

EXAMPLE 2

Effect of Diluent on X, LSX, and Chabazite Zeolites

The procedure set forth in Example 1 was used to determine the effect of diluent addition on the $O_2$ VSA performance of other zeolites. Example 1 demonstrated that LiCaLSX zeolite with residual sodium benefits from dilution. Other active adsorbent phases studied include X-zeolite and LSX-zeolite in the fully exchanged Li form, LSX-zeolite in the fully exchanged Ca and Na forms, highly-Li-exchanged LSX-zeolites with Ca and Na present in varying amounts, and highly exchanged Li Chabazite. The set of conditions identified at the optimum diluent content is not identical for all materials; however, as set forth in Example 1, only one set of operating conditions was used for all diluent levels for a given material. In this way, optimal performance for each zeolite can be compared.

TABLE III $O_2$ VSA Performance of 85%/10%/5% (Li,Ca,Na)LSX at Various Dilution Levels

| Diluent Content (%) | Simulation Results | | | | | | $N_2$ Working |
| --- | --- | --- | --- | --- | --- | --- | --- |
| | Recovery (%) | BSF (lb/lbmol) | lb Active Zeolite per lbmol of $O_2$ Product | ACF/lbmol Evacuated | Temp. Swing (°F.) | $N_2$ Capacity 1 atm 23° C. (mmol/g) | Capacity 23° C. (0.2-1.2 atm) (mmol/g) |
| 0 | 63.0 | 11971 | 11971 | 766 | 19.2 | 1.284 | 0.999 |
| 5 | 63.3 | 12241 | 11629 | 762 | 18.6 | 1.220 | 0.949 |
| 20 | 64.0 | 13304 | 10643 | 748 | 16.6 | 1.027 | 0.799 |
| 32.5 | 64.3 | 14588 | 9847 | 733 | 14.8 | 0.867 | 0.674 |
| 46 | 64.1 | 15559 | 9001 | 715 | 12.6 | 0.693 | 0.539 |
| 50 | 63.9 | 17496 | 8748 | 708 | 11.9 | 0.642 | 0.500 |
| 65 | 62.1 | 22285 | 7800 | 677 | 9.0 | 0.449 | 0.350 |
| 80 | 56.9 | 33505 | 6701 | 627 | 5.7 | 0.257 | 0.200 |

As expected, the addition of diluent causes the Bed Size Factor to increase. However, as shown in FIG. 1, the BSF does not increase as much as expected based on the amount of diluent added. For example, when 50% diluent is added to an 85%/10%/5% (Li,Ca,Na)LSX zeolite powder that has a BSF of 11971, the expected BSF to obtain the same weight of active zeolite phase in the adsorbent bed with the zeolite/diluent mixture is 23942, a 100% increase; however, the modeled result is 17496, an increase of only 46%. This effect results in lower zeolite usage (lb of active zeolite/lbmole of $O_2$ product) for the same $O_2$ production. See Table III.

Example 1 demonstrated that the BSF for a given zeolite does not increase by the amount expected with diluent addition. Similar plots for all materials studied show the same effect. This is thought to be due to the moderation of the temperature swings within the adsorbent bed, as increasing diluent content results in decreased temperature fluctuations. It is expected that this result holds true for any adsorbent, even those with low capacity, since they too experience some degree of cyclic temperature swings; however, significant differences between expected and actual BSF's will only occur for high-capacity materials.

Figure 2:
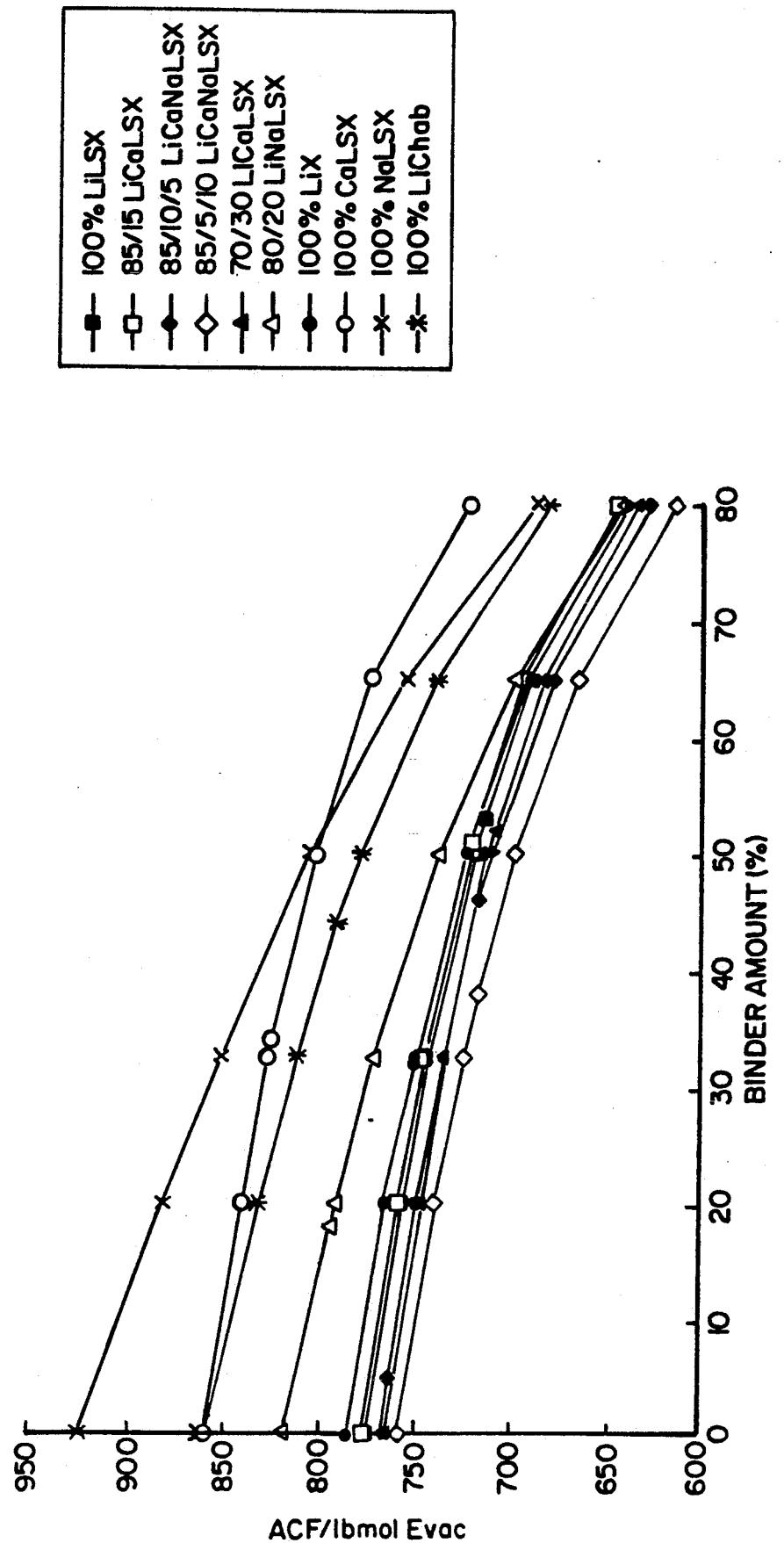
FIG. 2 is a graph of modeled results of actual cubic feet per pound mole of adsorbate evacuated (ACF/1-bmol Evac) versus the percent of diluent diluting an adsorbent for an array of adsorbents.

The effect of diluent addition on ACF/lbmol Evacuated for the materials described above is shown in FIG. 2. ACF/Evac dramatically decreases with increasing diluent content in all cases.

Figure 3:
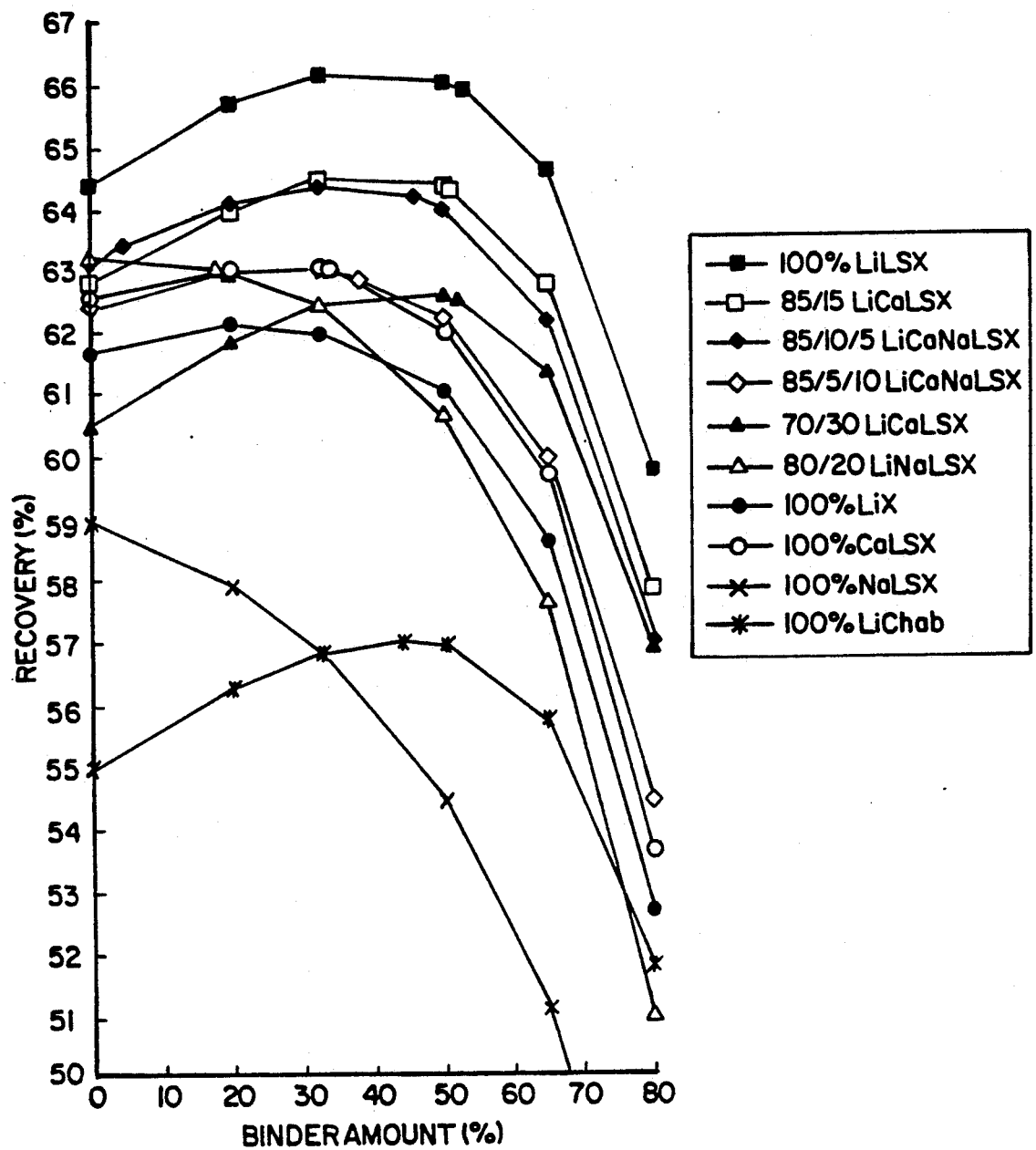
FIG. 3 is a graph of modeled results of oxygen recovery (product in relation to feed) versus the percent of diluent diluting an adsorbent for an array of adsorbents.

The effect of diluent addition on $O_2$ recovery is shown in FIG. 3. With the exception of two of the zeolites studied, recovery increases slightly and maximizes at a unique diluent content. In the case of 80%/20% (Li,Na)LSX-zeolite, recovery holds roughly constant across most of the diluent content range and then decreases slightly. In contrast to 80%/20% (Li,Na)LSX-zeolite and all other materials studied, 100% NaLSX-zeolite powder. This example demonstrates that the range in diluent levels that results in performance improvements (maintenance of $O_2$ recovery) is from 5% to greater than 80%, or that which results in $N_2$ isothermal working capacities as low as 0.2 mmol/g for the adsorbent/diluent in the adsorbent zone or bed. The upper dilution limit would be about 95% for a higher capacity material than those studied herein. In general, the performance optimum for an $O_2$ VSA process at the pressures studied is observed when the dilution level results in an isothermal $N_2$ working capacity of about 0.4 to 0.6 mmol/g for the adsorbent/diluent mixture.

TABLE IV $N_2$ Isothermal Working Capacities at Diluent Levels Which Maintain and Optimize Recovery

| Active Adsorb. Phase | Powder $N_2$ Working Capacity 23° C. (0.2-1.2 atm) (mmol/g) | % Diluent to Maintain Recovery w/in 5 pts | Powder/Diluent $N_2$ Working Capacity 23° C. @ Improved (0.2-1.2 atm) (mmol/g) | % Diluent Optimum Recovery | Powder/Diluent $N_2$ Working Capacity 23° C. @ Optimum (0.2-1.2 atm) (mmol/g) |
|---|---|---|---|---|---|
| LiLSX | 1.14 | 5-80+ | 1.1-0.2 | 20-55 | 0.9-0.5 |
| 85/15 (Li,Ca)LSX | 1.10 | 5-80 | 1.0-0.2 | 20-55 | 0.9-0.5 |
| 85/10/5 (Li,Ca,Na)LSX | 1.00 | 5-80 | 0.9-0.2 | 13-52 | 0.9-0.5 |
| 85/5/10 (Li,Ca,Na)LSX | 0.87 | 5-75 | 0.8-0.2 | 5-50 | 0.9-0.4 |
| 70/30 (Li,Ca)LSX | 1.10 | 5-80+ | 1.0-0.2 | 25-57 | 0.8-0.5 |
| 80/20 (Li,Na)LSX | 0.65 | 5-65 | 0.6-0.2 | 5-30 | 0.6-0.5 |
| LiX | 0.79 | 5-70 | 0.8-0.2 | 5-45 | 0.8-0.4 |
| CaLSX | 0.82 | 5-75 | 0.8-0.2 | 5-45 | 0.8-0.4 |
| NaLSX | 0.46 | 5-50 | 0.4-0.2 | — | — |
| LiCHA | 0.95 | 5-80+ | 0.9-0.2 | 25-55 | 0.7-0.4 | experiences a strong decline in product recovery with increasing diluent content. The influence of diluent on showing improved performance for 80%/20% (Li,Na)LSX-zeolite is borderline. Materials with $N_2$ isothermal working capacities significantly lower than that of 80%/20% (Li,Na)LSX-zeolite (i.e., isothermal $N_2$ working capacity less than about 0.6 mmol/g) would therefore not be expected to benefit as significantly from the addition of diluent.

EXAMPLE 3

Preferred Ranges of Dilution

As demonstrated in Example 2, increasing diluent addition to high-capacity zeolites has three major effects on performance: 1) the BSF does not increase by nearly the amount expected from the reduction in capacity, resulting in lower overall zeolite usage, 2) the ACF/lbmol Evacuated dramatically decreases, resulting in reduction of power requirements, and 3) the $O_2$ recovery increases. As with all commercial processes, the ultimate interest in improved performance is decreased cost. Although the BSF increases with dilution, Example 1 demonstrated that the amount of contained zeolite used to obtain the same $O_2$ production decreases. This, combined with the power advantages of lower ACF/Evac, will allow for significant cost benefits. In the dilution ranges that result in increased recovery, this cost advantage is clear. However, it may be commercially desirable to utilize an adsorbent with diluent amounts greater than that which results in optimum recovery, for high diluent content may facilitate easier forming of the desired particles. The process performance gains produced by the invention should counteract recovery losses up to about five percentage points. Table IV contains the isothermal working capacities (from 0.2 to 1.2 atm, at 23° C.) of the powder/diluent mixture for each material at diluent contents that maintain and optimize $O_2$ recovery over that of the zeolite

EXAMPLE 4

Dynamic Computer Model Simulation of Performance of Diluted 85%/10%/50% (Li,Ca,Na)LSX The performance of diluted 85%/10%/5% (Li,Ca,Na)LSX was simulated in a six-step, 3-bed, $O_2$ VSA cycle using SIMPAC in the manner described above. The heat capacity of the diluent was held equal to that of the zeolite powder. The effect of 20% diluent addition simulated by this model is shown in Table V.

TABLE V

SIMPAC Simulation of Diluent Addition to 85%/10%/5%(Li,Ca,Na)LSX Feed Temperature = 80° F., Feed Pressure = 1000 torr, Evacuation Pressure = 300 torr

|  | Powder | Powder w/20% Diluent |
|---|---|---|
| Recovery (%) | 66.0 | 65.6 |
| BSF (lb/lbmol) | 12370 | 14570 |
| ACF/lbmol Evac. | 681 | 673 |
| Temperature Profile: | | |
| Average Bed Temperature at the End of Each Step (°F.) | | |
| Step 1 | 82.7 | 78.6 |
| Step 2 | 93.2 | 87.4 |
| Step 3 | 92.8 | 87.1 |
| Step 4 | 80.5 | 76.7 |
| Step 5 | 78.3 | 74.8 |
| Step 6 | 80.8 | 76.8 |
| Total Temp-Swing | 14.9 | 12.6 |

As seen from Table V, the addition of 20% diluent causes an increase of about 18% in the BSF, as opposed to the expected 25%. Recovery is maintained, and ACF/Evac decreases slightly. In addition, the total temperature swings within the process are reduced. Total temperature swing is defined for SIMPAC simulations as the largest fluctuation within the cycle, or the difference between the highest and lowest temperatures seen (for this cycle, the difference between the temperature at the end of Step 2 and the end of Step 5).

EXAMPLE 5

Effect of Diluent Heat Capacity on Performance Improvements Due to Dilution of 85%/10%/5% (Li,Ca,Na)LSX The previous examples have demonstrated that dilution of a high-$N_2$-capacity zeolite with an inert material possessing the same heat capacity ($C_p$) as the zeolite produces an improved adsorbent zone or bed for air separation. In this example, the performance of diluted 85%/10%/5% (Li,Ca,Na)LSX zeolite was simulated using the GEM model described above, wherein the diluent heat capacity was varied from 0.15 to 0.35 BTU/lb-°R. The results are shown in Table VI.

TABLE VI

Effect of Diluent Heat Capacity ($C_p$) on Performance Improvements Due to Dilution of 85%/10%/5% (Li,Ca,Na)LSX Zeolite
$C_{p,zeolite\ powder}$ = 0.25 BTU/lb-°R
End-of-Feed Temperature = 75° F., Feed Pressure = 1000 torr, Evacuation Pressure = 300 torr

| Diluent Content (%) | $C_p$ of Diluent (BTU/lb-°R) | $C_p$ of Ads. Zone (BTU/lb-°R) | $O_2$ Rec. (%) | BSF (lb/lbmol) | ACF/ lbmol Evac. | Depress Temp. Swing (°F.) |
|---|---|---|---|---|---|---|
| 0 | N/A | 0.25 | 63.0 | 11971 | 766 | 19.2 |
| 5 | 0.25 | 0.25 | 63.3 | 12241 | 762 | 18.6 |
| 50 | 0.25 | 0.25 | 63.9 | 17496 | 708 | 11.9 |
| 50 | 0.35 | 0.30 | 65.1 | 16701 | 714 | 10.3 |
| 5 | 0.15 | 0.20 | 63.0 | 12368 | 760 | 18.8 |
| 50 | 0.15 | 0.20 | 62.2 | 18747 | 700 | 14.1 |

As expected, when the heat capacity of the diluent is higher than that of the zeolite, the improvements resulting from the dilution are even greater than when the heat capacities are the same. However, even in the case of a lower-heat-capacity diluent, the benefit is still evident. In the example given, 5% low $C_p$ diluent ($C_p$=0.15 BTU/lb-°R) in the adsorbent zone or bed provides a slight moderation of the temperature swing, decreases ACF/Evac, maintains recovery, and increases BSF only slightly. The BSF increase is 3.3%, still less than the expected 5.3%; hence, zeolite usage is still decreased. The 50% low-$C_p$ diluent case produces a significant performance gain. This example demonstrates that dilution with a material having a heat capacity 40% lower than that of the adsorbent results in performance benefits. The lower acceptable limit on the heat capacity of the diluent is dependent on: the heat capacity, the heat of adsorption and the $N_2$ adsorption capacity of the active adsorbent phase powder.

Although the inventors do not wish to be limited to any particular theory of the operation of the dilution effect of the invention it is believed that the benefits of diluent are related to the effect of temperature on the shape of the adsorbent's isotherm. Reduction of the temperature rise during the adsorption step of a PSA process results in higher adsorbate loading; likewise, reduction of the temperature decrease during the desorption step results in lower adsorbate loading. The net effect is increased adiabatic working capacity, resulting in lower BSF than expected. In air separation, since $N_2$ has a higher heat of adsorption than $O_2$, the effect should be larger for $N_2$. Thus, the ratio of the nitrogen adiabatic working capacity to the oxygen adiabatic working capacity should increase as temperature fluctuations decrease, resulting in lower losses of $O_2$ on the bed. In addition, reduction of temperature swings will result in a higher bed temperature during the desorption/evacuation step. This effectively "flattens" the isotherm, leaving a decreased amount of gas to be removed in the low pressure region, which provides a benefit in decreased ACF/Evac. The detriments of dilution include increased losses of $O_2$ in the voids and increased total extrusion costs for the adsorbent zone or bed, which will eventually overcome the above benefits at some high level of dilution.

The prior art has indicated that the presence of diluents in the form of traditional binders in air separation adsorbent particles, while beneficial to the physical strength of the formed particles, is detrimental to process performance due to decreased capacity compared to the active adsorbent phase. The failure of the prior art in recognizing the benefits of dilution may relate to the capacities of known air separation adsorbents. It is only with the advent of very high capacity adsorbents such as CaLSX-zeolite and LiX-zeolite that the benefit of reduced temperature fluctuations has achieved sufficient magnitude to make an impact on the economics of the air separation process. It is notable that these newer zeolitic adsorbents are known in the prior art only as powders or diluentless aggregates. There is no mention of their use in combination with diluent as part of a formed material. These zeolites include highly exchanged LiX-zeolite (and LiLSX-zeolite), CaLiLSX-zeolite, and Li-chabazite. It is surprising to use diluent with these materials to improve performance, because the prior art teaches that dilution is detrimental to adsorptive performance. It is even more surprising to use diluent addition beyond that which is needed for particle strength to provide a benefit in air separation adsorption processes. Furthermore, the prior art has not suggested that diluent with a heat capacity equal to or less than that of the adsorbent would provide performance advantages.

The invention provides an improved adsorbent zone or bed containing diluted adsorbent whose performance is equal or better than that of the non-diluted material, with the cost advantage resulting from smaller zeolite utilization, decreased ACF/Evac and better recovery than that achieved with a pure zeolitic adsorbent.

The present invention has been set forth with regard to several preferred embodiments. However, the scope of the invention should be ascertained from the claims below.

We claim;

1. The process of adsorbing nitrogen from a gas containing nitrogen, comprising; contacting said gas in an adsorption zone with an adsorbent selective for nitrogen and adsorbing nitrogen on said adsorbent, wherein said adsorbent zone comprises an active adsorbent phase with an isothermal nitrogen working capacity of at least about 0.6 mmol/g and at least about 5 weight percent of an inert diluent, wherein said gas is at a pressure no greater than 5 atmospheres.

2. The process of claim 1 wherein said diluent is substantially integral with said active adsorbent phase.

3. The process of claim 1 wherein said diluent is substantially discrete from said active adsorbent phase.

4. The process of claim 1 wherein said isothermal nitrogen working capacity of said active adsorbent phase is determined at about 23° C. and over a pressure change of about 0.2 to 1.2 atmospheres.

5. The process of claim 1 wherein the heat capacity of the diluent is no greater than the heat capacity of said active adsorbent phase.

6. The process of claim 1 wherein the heat capacity of the diluent is greater than the heat capacity of said active adsorbent phase.

7. The process of claim 1 wherein the diluent is at least about 25 weight percent of the adsorbent zone.

8. The process of claim 7 wherein the diluent is in the range of about 25 to 95 weight percent of the adsorbent zone.

9. The process of claim 8 wherein the diluent is in the range of 25 to 80 weight percent of the adsorbent zone.

10. The process of claim 9 wherein the diluent is in the range of 60 to 80 weight percent of the adsorbent zone.

11. The process of claim 1 wherein said isothermal nitrogen working capacity of said active adsorbent phase and the amount of diluent are such as to provide an isothermal nitrogen working capacity of said adsorbent zone of about 0.4 to 0.6 mmol/g.

12. The process of claim 1 wherein said active adsorbent phase is selected from the group consisting of zeolite, titanium silicates, phosphates and mixtures thereof.

13. The process of claim 12 wherein said active adsorbent phase is a zeolite selected from the group consisting of A-zeolite, X-zeolite, Y-zeolite, chabazite and mixtures thereof.

14. The process of claim 13 wherein said active adsorbent phase has a zeolitic silicon to aluminum ratio less than or equal to 1.5.

15. The process of claim 13 wherein the zeolite is ion exchanged with lithium to at least approximately 50%.

16. The process of claim 15 wherein the zeolite is ion exchanged with a second ion to approximately 5% to 50%.

17. The process of claim 16 wherein the zeolite is ion exchanged with approximately 15% of the second ion and 85% lithium.

18. The process of claim 16 wherein the second ion is selected from the group consisting of calcium, strontium and mixtures thereof.

19. The process of claim 18 wherein the zeolite has a zeolitic silicon to aluminum ratio in the range of approximately 1 to 1.5.

20. The process of claim 16 wherein the zeolite is ion exchanged with approximately 15% calcium and 85% lithium.

21. The process of claim 1 wherein the gas contains nitrogen and oxygen.

22. The process of claim 1 wherein the gas is air.

23. The process of claim 1 wherein an oxygen and nitrogen containing gas contacts said adsorbent zone, the nitrogen is selectively adsorbed and the oxygen passes through said zone and is recovered as an oxygen enriched product.

24. The process of claim 23 wherein the oxygen product has a purity of at least approximately 90% oxygen.

25. The process of claim 23 wherein the zone is operated through a series of steps comprising: adsorption during which the gas contacts said active adsorbent phase, nitrogen is selectively adsorbed and oxygen passes through the zone and is removed; depressurization during which the gas contact is discontinued and the zone is reduced in pressure to desorb the nitrogen; and repressurization with oxygen to the adsorption pressure.

26. The process of claim 23 wherein the zone is operated through a series of steps comprising: adsorption during which the gas contacts said active adsorbent phase, nitrogen is selectively adsorbed and oxygen passes through the zone and is removed; depressurization during which the gas contact is discontinued and the zone is reduced in pressure to desorb the nitrogen; evacuation to further desorb the nitrogen to below ambient pressure; and repressurization with oxygen to the adsorption pressure.

27. The process of claim 1 wherein said active adsorbent phase is a crystalline X-zeolite adsorbent having a framework $SiO_2/Al_2O_3$ molar ratio of not greater than 3.0 and having at least 88 percent of its $AlO_2$ tetrahedral units associated with lithium cations.

28. The process of claim 1 wherein said active adsorbent phase comprises a crystalline X-zeolite having a zeolitic Si/Al ratio $\leq 1.5$ and an at least binary ion exchange of the exchangeable ion content with between 5% and 95% lithium and with between 5% and 95% of a second ion selected from the group consisting of calcium, strontium and mixtures thereof, wherein the sum of the lithium and second ion ion exchange is at least 60% of the exchangeable ion content.

29. The process of claim 1 wherein said active adsorbent phase is lithium exchanged chabazite having a Si/Al ratio from about 2.1 to 2.8 wherein at least 65% of the exchangeable ion capacity is in the lithium form.

* * * * *